United States Patent [19]

Chandler et al.

[11] Patent Number: 5,043,077
[45] Date of Patent: Aug. 27, 1991

[54] TREATMENT OF BAYER PROCESS RED MUD SLURRIES

[75] Inventors: John L. Chandler, Mandeville, Jamaica; Dirk Noteboom; Ronald D. Paradis, both of Jonquiere, Canada; John C. Winch, St. Lazare, Canada

[73] Assignee: Alcan International Limited, Montreal, Canada

[21] Appl. No.: 448,677

[22] Filed: Dec. 11, 1989

[51] Int. Cl.$^5$ .................. C02F 11/00; C02F 37/03
[52] U.S. Cl. .................... 210/698; 210/730; 210/749; 210/751; 210/803; 423/119; 423/120; 423/121
[58] Field of Search ............ 210/696, 698, 701, 730, 210/749, 751, 800, 803; 423/119, 120, 121

[56] References Cited

U.S. PATENT DOCUMENTS

| | | | |
|---|---|---|---|
| 3,776,717 | 12/1973 | Kapolyi et al. | 423/132 |
| 4,146,573 | 3/1979 | Kane | 423/119 |
| 4,235,727 | 11/1980 | Firth, Jr. | 252/8.5 C |
| 4,311,600 | 1/1982 | Firth, Jr. | 252/8.50 |

Primary Examiner—Stanley S. Silverman
Assistant Examiner—Neil M. McCarthy
Attorney, Agent, or Firm—Cooper & Dunham

[57] ABSTRACT

A method of treating Bayer process red mud slurries to improve or facilitate the handling thereof, comprising adding to such a slurry a minor porportion of humic acids or humates effective to reduce the viscosity of the slurry.

15 Claims, 1 Drawing Sheet

TREATMENT OF BAYER PROCESS RED MUD SLURRIES

BACKGROUND OF THE INVENTION

This invention relates to a method of treating Bayer process red mud slurries to improve or facilitate the handling of such slurries.

In the Bayer process for obtaining alumina from bauxite, the bauxite is initially digested with caustic soda to extract alumina values as dissolved sodium aluminate in an aqueous liquor which also contains, in suspension, undissolved particulate residues of the original bauxite. The particulate residues, known as red mud, are separated from the Bayer process liquor and collected in a concentrated slurry for transport to a storage or disposal site, while the process liquor is subjected to decomposition to precipitate alumina trihydrate, the latter being calcined to recover the desired alumina product.

Red mud is generally considered as a waste product, although it has some present or potential uses. Chemically, it comprises, in varying amounts (depending upon the composition of the starting bauxite), oxides of iron and titanium, residual alumina, sodalite, silica, and minor quantities of other metal oxides.

In the Bayer process, after initial separation from the process liquor, the red mud is typically washed in a countercurrent washing circuit to remove most of the caustic soda carried with the red mud from the starting liquor. It is thereby made up into an aqueous slurry, which is thickened or filtered to a high solids concentration (high solids consistency, typically about 10–70% by weight solids) for delivery to a storage or disposal site. The percentage of solids depends on the granulometry of the bauxite and of the red mud. For very finely divided red mud, such as obtained from Jamaica bauxite, the solids content is between 15 and 30%; for coarser bauxite and red mud, such as obtained from African bauxite, the solids content can range from 60 to 70%. The aqueous vehicle of this slurry still has significant alkalinity, e.g. a concentration of NaOH (expressed as Na2CO3) of 1 to 40 g/L, but more usually from 4 to 25 g/L. Such high-solids, alkaline red mud slurries underflow the mud thickeners and mud filters of Bayer process plants, and are usually pumped therefrom (ordinarily with high pressure positive displacement pumps) over relatively long distances to storage or disposal sites. The term "Bayer process red mud slurry" will be used herein to refer to alkaline aqueous red mud slurries of this character, viz., slurries of red mud as separated from a Bayer process line and prepared for discharge or transport to a storage/disposal site.

One known technique for disposing of Bayer process red mud slurry is known as "stacking" or "stacking and drying." This technique involves adjusting the solids concentration of the slurry to produce a flowability that will enable the slurry to stack, at its angle of repose, at the disposal site. The angle of repose needs to be within fairly well defined limits in order to allow rainfall to drain off the stack rapidly, but not so rapidly as to create erosion channels in the stack, and to maximize the life of the stacking site.

Heretofore, the handling and pumping of Bayer process red mud slurries have presented problems, owing in particular to the high viscosity (and consequent low flowability for transport) of such slurries. To facilitate pumping and reduce pumping pressure or to obtain a lower consistency of the red mud slurry, water is often added. The addition of water, however, is attended with disadvantages, in that it is a diluent which must be removed (as by evaporation and/or drainage) to achieve proper consolidation of the mud at the disposal site. The necessity for such removal slows down the consolidation of the mud. Thus, in the stacking and drying technique, stacking is followed by solar drying of the stack to produce a dry, hard solid. In this case it is important to minimize, or eliminate completely, the addition of water to increase flowability, as such addition increases the evaporation load at the disposal site. Furthermore, because of the unavoidable alkalinity of Bayer process red mud slurries, the water drained at the disposal site cannot be simply discharged to the environment but must be pumped back to the plant.

Various expedients that have been proposed to increase the flowability of Bayer process red mud slurries without addition of water have included violent agitation or the addition of a dispersant. Agitation, however, often has only limited effectiveness, and the addition of dispersants is frequently expensive (in cost per unit of tailing solids, i.e. red mud, treated). As illustrative of such dispersants, U.S. Pat. No. 4,146,573 describes adding a low molecular weight polymer such as acrylic acid polymer to enhance the fluidity of the mud, and U.S. Pat. No. 4,464,479 describes admixing the red mud (e.g. directly after the red mud has been separated by filtration from the Bayer process liquor) with coal dust, preferably very finely divided brown coal or lignite, in an amount equal to 10%–200% of the red mud, so as to reduce flowability and produce a grainy mixture which can be easily handled or transported.

Additives have also been proposed to improve the consistency red mud as a useful commercial product. Thus, U.S. Pat. No. 3,886,244 sets forth that the consistency of red mud when used to make bricks can be adjusted by adding a water-fixing substance such as coal dust, cork or peat.

Humic substances are naturally occurring complex organic materials always found in low to medium concentrations in soils, but which occur in deposits of high concentration in some geographic areas. Humic substances have been described by Schnitzer, M., and Khan, S. U., on page 3 of *Humic Substances in the Environment*. New York: Marcel Dekker Inc., 1972, as amorphous brown or black, hydrophilic, acidic, polydisperse substances of molecular weight from several hundred to tens of thousands. Humic substances are generally classified according to their solubility in alkali and acid as follows:

(1) Humic Acid: soluble in dilute alkali but is precipitated on acidification of the alkaline extract.

(2) Fulvic Acid: humic fraction that remains in the aqueous acidified solution, i.e. soluble in both acid and alkali.

(3) Humin: humic fraction that cannot be extracted by dilute alkali and acid.

High concentrations of humic acids can be found in lignite or brown coal. According to *Kirk-Othmer Encyclopedia of Chemical Technology*, 3d ed., vol. 14, pp. 313–43, lignite and brown coal are terms used to describe coals of the lowest degree of coalification. Typically, lignite deposits are from one to 60 million years old. Lignitic coals tend to oxidize more readily than older ones. The moisture content of lignites is much higher than that of older coals, ranging up to 70%. The oxygen:carbon ratio ranges above 0.2. Low temperature carbonization produces oils for conversion to motor fuels.

Leonardite is a naturally oxidized form of lignite (brown coal) with a high content of humic acids, which may be described as carboxylated phenolic polymers. It is described in *Kirk-Othmer Encyclopedia of Chemical Technology*, 3d ed., vol. 17, p. 155 (1982), and in U.S Pat. No. 4,778.608. Leonardite is mined, in the western United States, e.g., in Williston, North Dakota, and manufactured into dry, free flowing powders. It has been used in drilling fluids as a thinner (to adjust the flowability of drilling muds), for filtration reduction and for oil emulsification and as a stabilizer, and to reduce the viscosity of coal slurries pumped in long-distance pipelines.

There is no sharp demarcation line between lignite and leonardite. It is to be understood that the terms "lignite" and "leonardite" are used herein interchangeably to denote a naturally occurring material that contains useful concentrations of humic acid or humates. Furthermore, the term "humates" is used herein to mean the salts of humic acids, which either occur in nature or are formed when humic acids react with substances which convert the acids to another form.

SUMMARY OF THE INVENTION

The present invention broadly contemplates a method of treating a Bayer process red mud slurry by adding thereto a minor proportion, of material of the class consisting of humic acids and humates, effective to reduce the viscosity of the slurry.

In accordance with the invention, in currently preferred embodiments, the humic acids may be added in the form of lignite or leonardite, either as a dry powder or as a slurry, e.g. in an aqueous vehicle, in a proportion of about 0.1 to about 10% (all proportions of lignite addition herein are expressed as percent by weight of lignite solids based on the weight of red mud solids). It is found that even small (0.1-5%) additions of lignite will reduce the slurry consistency and make the slurry advantageously more fluid. A currently particularly preferred range of lignite addition is 0.25-2%.

The lignite powder must be mixed intimately with the slurry. In one procedural embodiment of the invention, the lignite is introduced to the slurry in a red mud thickener in a Bayer process plant. In another embodiment, currently preferred in at least certain instances, the Bayer process red mud slurry is divided into a major stream and a minor stream; lignite powder is admixed with the minor stream; and the minor stream is then recombined with the major stream, advantageously ahead of a pump or agitator in a line for delivering the slurry to a disposal site, the pump or agitator serving to complete the intimate mixing of the powder into the full volume of the slurry. In the latter embodiment, the concentration of lignite powder added to the minor stream (in weight percent based on the red mud solids concentration of the minor stream) is equal to the desired lignite concentration in the full slurry times the ratio of the flow rate of the full slurry stream to the flow rate of the minor stream.

As at present believed, the reason that humic acids and humates are effective as thinning agents for red mud is that they are soluble in the caustic or alkali solution always present in Bayer process red mud slurries. The dissolved humates affect the water-retaining properties of the red mud, probably by changing the electric double layer around the particles (thereby affecting the surface charge) or by removing the flocculant structure.

Further features and advantages of the invention will be apparent from the detailed description hereinbelow set forth, together with the accompanying drawing.

DETAILED DESCRIPTION

Figure 1:
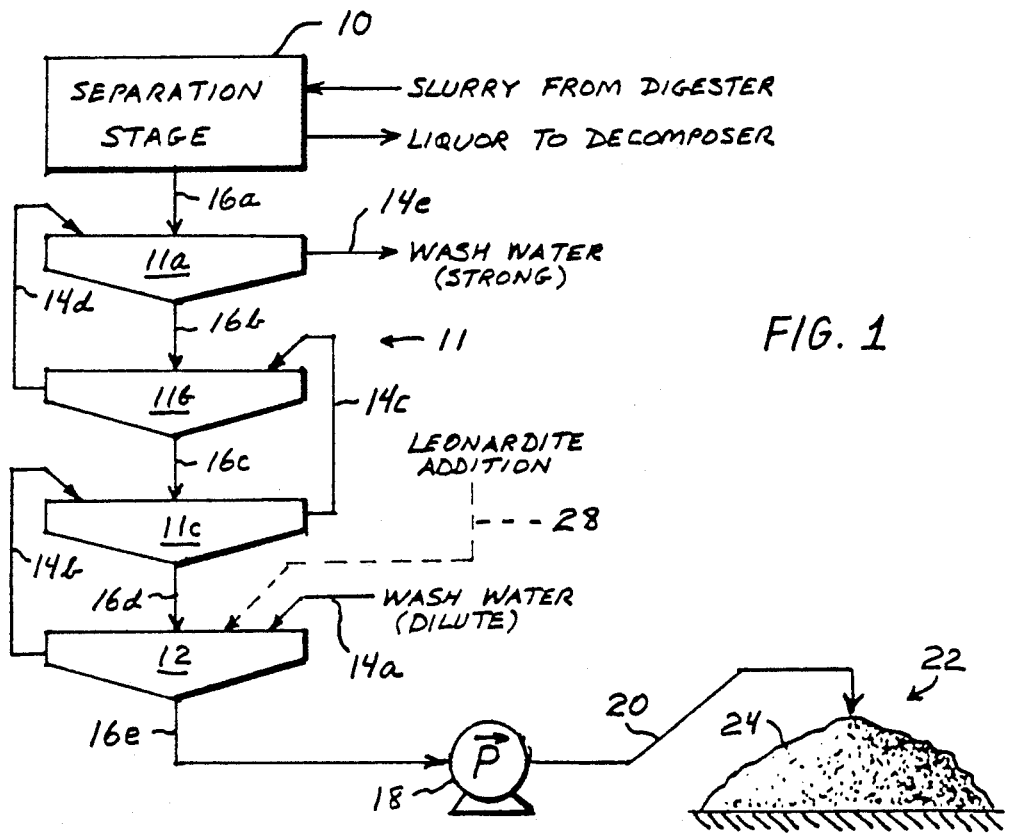
FIG. 1 is a simplified schematic and partially diagrammatic view of the red-mud-handling portion of a conventional Bayer process plant, illustrating the incorporation therein of one exemplary embodiment of the invention.

Referring first to FIG. 1, the Bayer process plant therein represented is of the usual character, including an extraction or digester stage (not shown) wherein bauxite is digested in an aqueous caustic liquor to extract alumina values from the bauxite as sodium aluminate dissolved in the liquor, leaving undissolved the residue known as red mud, forming a slurry with the liquor; a separation stage 10, to which this slurry is advanced from the digester, for separating the red mud from the liquor; and a decomposer stage (also not shown) to which the clarified liquor is delivered from the separation stage for precipitation of aluminum trihydroxide. The thickened red mud slurry passes from the separation stage 10 to a countercurrent washing circuit 11 shown as including a succession of vessels 11a, 11b, 11c, and a final thickener vessel 12.

In the washing circuit, the red mud is slurried in an aqueous wash liquid, which is pumped upwardly from vessel to vessel as indicated by lines 14a, 14b, 14c, 14d and 14e while the slurried red mud descends from vessel to vessel (i.e., underflowing each vessel) as indicated by lines 16a, 16b, 16c, 16d and 16e. The wash liquid progressively removes, from the red mud, caustic soda carried with the red mud from the process liquor, and thereby acquires an increasing caustic concentration; thus, the wash liquid entering the washing circuit 11 through line 14a is dilute, and the liquid leaving the circuit through line 14e has a relatively strong concentration of caustic soda, which may be recovered for reuse in the Bayer process line.

The red mud slurry underflowing the final thickener 12 (through line 16e) nevertheless still has a substantial concentration of caustic, e.g. a concentration of about 1 to about 40 g/L NaOH (expressed as $Na_2CO_3$). In and ahead of the thickener 12, it has been thickened to a high consistency (solids concentration), typically on the order of 15 to 55%, depending on the properties of the mud. From line 16e it is delivered by means of a pump 18 and pipeline 20 to a disposal site 22, which may be remote from the Bayer process plant. At the disposal site, the red mud slurry may be deposited on a stack 24 for solar drying, in accordance with the "stacking" disposal technique.

In an alternative arrangement practiced at other locations, the red mud leaving the last washing stage 12 is further thickened by a filtration operation to give a residue that contains up to 45 to 65% solids. This thickened residue on the filter may be further washed with the filtrate from the original filtration. The wash filtrate is then returned to process stream 14a.

As thus far described, the Bayer process operation represented in FIG. 1 is wholly conventional and well-known to persons of ordinary skill in the art. The thickened, alkaline, aqueous red mud slurry underflowing thickener 12 (or after further thickening by filtration) exemplifies the Bayer process red mud slurries with which the present invention is concerned. In its conventional condition, it is characterized by high viscosity and correspondingly poor flowability, and accordingly requires use of a high pressure positive displacement pump as the pump 18, especially when it must be transported over a substantial distance to the disposal site.

In accordance with the invention, there is added to the Bayer process red mud slurry a minor proportion of lignite (in fine powdered state, either dry or slurried e.g. in an aqueous vehicle) effective to reduce the viscosity of the slurry and thereby to increase its flowability. Lignite additions of about 0.1 to about 10% (expressed, as stated, in terms of weight of dry leonardite as a percent of dry weight of red mud solids) are found to be effective for this purpose, the amount of the addition being dependent on the solids concentration of the untreated slurry, the properties of the particular red mud being treated, and the desired viscosity or flowability of the treated slurry. Lignite additions of about 0.1-5% (most preferably about 0.25-2%) are currently preferred in at least most instances.

Figure 2:
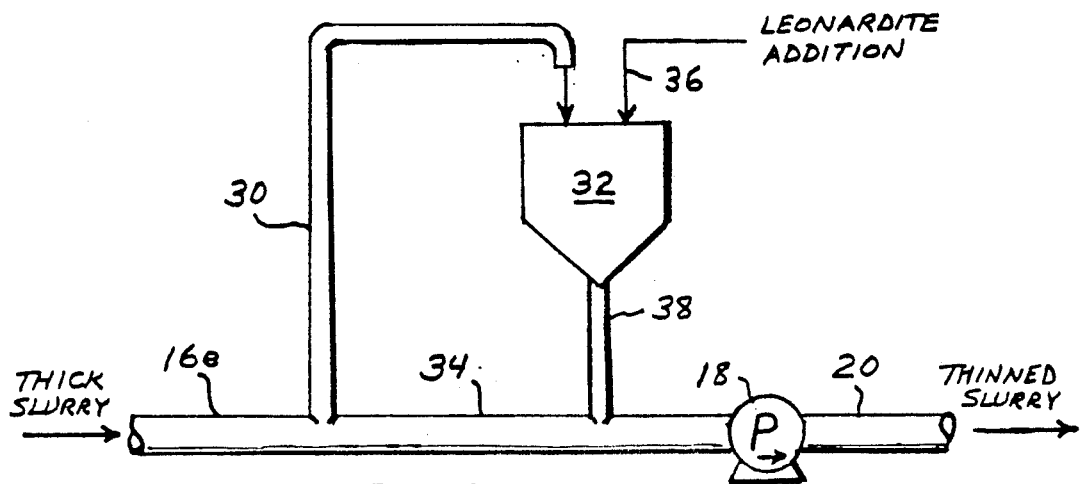
FIG. 2 is a simplified schematic view in illustration of another embodiment of the invention.

The lignite may be added at any convenient point in the red mud line between the separation stage 10 and the disposal site 22. To optimize the benefit of enhanced flowability, it is advantageous to perform the addition at or ahead of the upstream end of the pipeline 20 (in the system of FIG. 1). Thus, for example, the lignite may be added to the red mud slurry in the thickener 12, as indicated at 28 in FIG. 1. Alternatively, the lignite can be injected directly into the bed of red mud which has settled in the lower part of the thickener 12. Direct injection of the lignite, conveniently as a slurry suspended in a dilute solution of caustic, into the bed reduces the possibility that the lignite may report back to the supernatant liquor of the thickener, and from there to the process streams. In yet another alternative, as shown in FIG. 2, the lignite may be added between the thickener 12 and the pump 18. In any event, the fine powdered lignite or a slurry of lignite in caustic solution is added in such manner as to be thoroughly and intimately mixed with the slurry.

In the case where the mud is thickened by filtration, rather than by settling as described above, the lignite is added to the filtered solids in a mud mixer before being sent to the disposal pumps. When the lignite is not added, these solids can be mixed only in a high rate shear, after the addition of water to increase their fluidity.

FIG. 2 further illustrates a convenient process feature for addition of lignite to a Bayer process red mud slurry (either at the last-mentioned location or at some other point in the red mud line between the separation stage and the disposal site), to achieve the requisite intimate mixture. As there shown, from a main stream of thick Bayer process red mud slurry (exemplified as advancing through line 16e), a minor flow or small side stream is diverted through a conduit 30 into an open tank or funnel 32, while the major flow of the slurry continues to advance along pipe 34. Fine dry powdered lignite is added to the tank or funnel 32 as indicated at 36, for intimate admixture with the side stream. From funnel 32, the lignite-bearing side stream is reinjected (by a pump or other suitable means, not shown) through a conduit 38 into the major flow in pipe 34; preferably, this injection occurs at the suction side of a pump (e.g. pump 18) or upstream of an in-line agitator (not shown) so as to complete the intimate mixing of the powder into the full volume of the slurry. Pump 18 then advances the slurry, reduced in viscosity or effectively "thinned" by the leonardite addition, e.g. along pipeline 20 to the disposal site.

The rate of addition of dry lignite powder to the funnel 32, in the embodiment illustrated in FIG. 2, is that which will produce a lignite concentration $C(S)$, in the minor flow or side stream, equal to $C(M)\{F(M)/F(S)\}$, where $F(M)$ is the required lignite concentration in the main stream (to achieve a desired reduction in viscosity or "thinning" effect) and $F(M)/F(S)$ is the ratio of the main stream flow rate $F(M)$ (ahead of conduit 30) to the flow rate $F(S)$ of the side stream in conduit 30. In this way, the required main-stream concentration of lignite is readily and intimately incorporated into the full flow of the slurry being treated.

In the preferred embodiment of the process for adding the lignite, the minor flow stream is taken off after the pump 18, sent to the admixing tank 32, and from there is returned to the main stream at a point before the pump 18.

As mentioned above, for pumping concentrated red mud slurries over long distances, at present high pressure positive displacement pumps are required. With the addition of lignite, less energy is required and regular centrifugal pumps could be used, or fewer positive displacement pumps are required.

The addition of lignite may also enable the more liquid red mud slurry to be refiltered again to higher solids concentrations than have heretofore been obtained. In addition, lignite added to red mud in a Bayer process mud thickener (as shown in FIG. 1) may result in higher underflow solids concentrations since thickeners, and in particular deep thickeners, are believed to be consistency controlled.

In summary, the present invention enables a Bayer process red mud slurry of any given solids concentration to be handled more easily, and pumped with less energy consumption, than has been possible in the past. Alternatively, the invention enables a substantially higher solids concentration (with consequently reduced water removal requirements) to be handled with the same facility as slurries of currently conventional solids content.

The invention will be further described, by way of specific example, with reference to the treatment of Bayer process red mud slurries at commercial Bayer process plants in Jamaica; at Jonquiere, Quebec, Canada; and at Aughinish, Ireland. The red muds produced at these plants differ from each other because the bauxite ores they respectively process come from different sites and have different compositions. A comparison of typical physical properties of these three red muds is given in Table 1 below; and a comparison of their typical chemical and mineral compositions is given in Table 2 below.

TABLE 1

| | Jonquiere | Jamaica | Aughinish |
|---|---|---|---|
| Specific Gravity Red Mud Solids (g/cm3) | | | |
| average | 3.2 | 3.35 | 3.34 |
| range | 3.1–3.3 | 3.2–3.8 | 3.2–3.5 |
| Specific Surface Area Red Mud Solids (m2/g) | | | |
| | 12.0–13.0 | 39–50 | 17 |

TABLE 1-continued

|  | Jonquiere | Jamaica | Aughinish |
|---|---|---|---|
| Granulometry (% greater than particle size, microns) | | | |
| 200 microns | 16 | 3 | — |
| 70 microns | 23 | 5 | 4 |
| 10 microns | 52 | 17 | 23 |
| 4 microns | 72 | 43 | 50 |
| 2 microns | 92 | 87 | 90 |

TABLE 2

|  | Jonquiere | Jamaica | Aughinish |
|---|---|---|---|
| Chemical Composition (XRF) (weight percent) | | | |
| Al2O3 | 24.1 | 16.5 | 17.2 |
| Fe2O3 | 34.6 | 46.1 | 21.7 |
| SiO2 | 14.04 | 5.09 | 9.01 |
| TiO2 | 7.37 | 6.44 | 23.0 |
| Cr2O3 | 0.12 | 0.20 | 0.58 |
| CaO | 0.73 | 7.27 | 11.91 |
| P2O5 | 0.18 | 1.35 | 0.31 |
| ZrO2 | 0.25 | 0.15 | 0.55 |
| ZnO | 0.002 | 0.059 | 0.005 |
| MnO | 0.09 | 1.36 | 0.09 |
| V2O5 | 0.13 | 0.25 | 0.27 |
| K2O | 0.06 | 0.08 | 0.04 |
| MgO | 0.02 | 0.14 | 0.10 |
| Ga2O3 | 0.012 | 0.002 | 0.003 |
| Na2O | 7.2 | 2.4 | 5.2 |
| SO3 | 0.3 | 0.2 | 0.4 |
| LOM | 8.47 | 9.67 | 7.39 |
| Mineral Composition (XRD) | | | |
| hematite | major | major | minor |
| Al. goethite | major | medium | minor |
| Bayer sodalite | medium | minor | — |
| anatase | medium | medium | — |
| boehmite | minor | minor | minor |
| quartz | minor | — | — |
| rutile | minor | minor | — |
| gibbsite | minor | — | minor |
| portlandite | min. (poss.) | — | — |
| lime | — | minor | — |
| calcite | — | minor | — |
| perovskite | — | — | major |
| cancrinite | — | — | ? |

EXAMPLE I

A series of laboratory tests were conducted with red mud from Jamaica Bayer process plants of Alcan Jamaica Company, using a dry leonardite powder commercially available under the trade name "Humite."

In the first of these tests, a small sample of the leonardite powder was added to plastic red mud at 38% solids concentration (from the red mud pond at Alcan Jamaica Company's Kirkvine Works) in a beaker. After about one minute of hard mixing, the mud was thin enough to pour out of the beaker.

In a second test using the same Kirkvine red mud at 38% solids concentration, the addition of leonardite required to thin the mud to a torque reading of 60 (indicating stackable flowability) was 0.7% of the red mud solids weight. The torque reading was obtained with a Brookfield digital Viscometer, Model RV Spindle No. 2, at a rotation speed of 100 r.p.m.

Several tests were then performed on samples of red mud from Alcan Jamaica Company's Ewarton Works. In each case, the amount of leonardite addition (expressed as weight % of dry mud solids) required to achieve a stackable consistency (flowability) was determined. Results were as follows:

| Sample | Solids Conc. (%) | Leonardite addition needed (%) |
|---|---|---|
| 1 | 40 | 1.6 |
| 2 | 33 | 0.9 |
| 3 | 33 | 1.2 |
| 4 | 31 | 1.0 |

Samples 1 and 2 were of the same red mud, taken from the surge tank, and were quite sandy. Sample 3 was a sample of deep thickener underflow. Sample 4 was the same material as sample 3 but diluted to 31% solids concentration.

The indication from these tests is that about 1% of leonardite (weight percent, based on the weight of dry mud solids) is necessary to thin a 30% solids Bayer process red mud slurry to a stackable consistency.

To test the effectiveness of introducing the leonardite powder to a side stream (as shown in FIG. 2), a 1/10 portion of a sample of the abovementioned Kirkvine Works red mud in a beaker was removed from the beaker, and leonardite powder was added to this removed 1/10 portion, in an amount equal to 7% of the weight of the removed 1/10 portion. The latter portion, with the admixed leonardite, was returned to the balance of the sample in the beaker and thoroughly mixed therein. The resulting concentration of leonardite in the whole sample was 0.7% and a check on its fluidity (by the abovedescribed torque measurement) showed that the thinning (viscosity reduction) effect was the same as when 0.7 weight percent of leonardite was added directly to a full sample (i.e., as in the second test described above).

In all the above series of tests, the possibility that the thinning effect was due not to the leonardite powder, but rather to the agitation used to mix it, was eliminated by running blank tests with the same agitation but no powder addition.

In Jamaica, the Ewarton Works Bayer plant pumps out to the dry mud stack (disposal site) a red mud slurry at a consistency which is obtained as a solids concentration of 25%. This mud on the stack has to dry in a limited time period before a new layer of mud is laid out. With the addition of 0.5% of leonardite the same consistency can be obtained at 30% solids as at 25% solids without the addition so that considerably less water has to be removed by solar drying.

EXAMPLE II

Laboratory tests have been carried out on the effect of different dosages of lignite from Rossland, Alberta, Canada (which had a screen size of 47% >38 microns) on the rheology of Bayer process red mud slurries from the Aughinish Bayer process plant (67.9% solids) and from the Jonquiere Bayer process plant (65.6% solids). The results of the rheological test work using a Haake VT500 viscotester with a vane type spindle (FL100) are summarized below. From the shear stress/shear rate curve the results for a shear rate at D=40/sec. are as follows:

| Lignite addition (%) | 0 | 0.25 | 0.5 | 1.0 | 2.0 |
|---|---|---|---|---|---|
| Aughinish mud shear stress (Pa) | 100 | 20 | 10-12 | 19 | 12 |
| Jonquiere mud shear stress (Pa) | 110 | 100 | 10 | 10 | — |

The Aughinish mud is a Bayer process red mud slurry in a solution containing 4 g/L NaOH, expressed as Na2CO3. The Jonquiere mud is a Bayer process red mud slurry in a solution containing 25 g/L NaOH as Na2CO3.

The screen size distribution of the lignite used in this example was as follows:

| Mesh | Microns | Wt. % | Cumulative Wt. % |
|---|---|---|---|
| +100 | 150 | 15.2 | 15.2 |
| 100 × 150 | 105 | 7.4 | 22.6 |
| 150 × 200 | 74 | 8.7 | 31.3 |
| 200 × 325 | 44 | 11.7 | 43.0 |
| 325 × 400 | 38 | 3.5 | 46.5 |
| −400 | 38 | 53.5 | 100.0 |

It is to be understood that the invention is not limited to the features and advantages herein specifically set forth, but may be carried out in other ways without departure from its spirit.

What is claimed is:

1. A method of treating a Bayer process red mud slurry comprising adding to said slurry an amount of a substance consisting essentially of material of the class consisting of humic acids and humates, effective to reduce the viscosity of said slurry.

2. A method according to claim 1, wherein the step of adding said material is performed by adding to said slurry a minor proportion of lignite.

3. A method according to claim 2, wherein said lignite is added as a dry powder.

4. A method according to claim 2, wherein said lignite is added as a slurry.

5. A method according to claim 2, wherein said lignite is added in a proportion of about 0.1 to about 10%.

6. A method according to claim 2, wherein said lignite is added in a proportion of about 0.1 to about 5%.

7. A method according to claim 2, wherein said lignite is added in a proportion of about 0.25 to about 2%.

8. A method according to claim 1, wherein said red mud slurry is a slurry of red mud in an aqueous solution containing at least about 1 g/L NaOH expressed as Na2CO3.

9. A method according to claim 8, wherein said red mud slurry has a solids concentration of at least about 10%.

10. In procedure for recovering alumina values from bauxite by the Bayer process, wherein bauxite is digested in caustic liquor to extract alumina values as sodium aluminate dissolved in the liquor, leaving undissolved red mud residue, and wherein the red mud residue is successively separated from the liquor, washed to form a Bayer process red mud slurry, and transported in said slurry to a disposal site, the improvement which comprises adding to the red mud slurry a minor proportion of a substance consisting essentially of lignite effective to reduce the viscosity of said slurry.

11. Procedure according to claim 10, wherein the red mud slurry is thickened in a thickener before being transported to the disposal site, and wherein the lignite is added to the slurry in the thickener.

12. Procedure according to claim 11, where in said thickener has a lower part in which a bed of red mud settles, and wherein the lignite is injected as a slurry directly into said bed of mud settled in said lower part of the thickener.

13. Procedure according to claim 10, wherein the red mud slurry is thickened by filtration before being transported to the disposal site, and is transported to the disposal site by one or more disposal pumps, and wherein the lignite is added to the thickened slurry after filtration in a mixing device upstream of said pumps.

14. A method of treating a flow of Bayer process red mud slurry, comprising diverting a minor portion of the flow, incorporating in said diverted minor portion of the flow an amount of a substance consisting essentially of lignite powder, thereafter returning the minor portion of the flow to the remainder of the flow, and thoroughly admixing the returned minor portion of the flow with the remainder of the flow, the amount of lignite powder incorporated in the minor portion of the flow being such as to impart to the entire flow a lignite concentration effective to reduce the viscosity of the flow.

15. A Bayer process red mud slurry having incorporated therein a proportion of a substance consisting essentially of material of the class consisting of humic acids and humates effective to reduce the viscosity of said slurry.

* * * * *